(12) United States Patent
Kinasewich et al.

(10) Patent No.: US 9,044,708 B2
(45) Date of Patent: Jun. 2, 2015

(54) HEADSPACE GAS TREATMENT APPARATUS AND METHOD

(75) Inventors: Harold Kinasewich, Edmonton (CA); Kyle Greene, Edmonton (CA); Todd J. Webb, Tofield (CA)

(73) Assignee: Seair Inc., Edmonton, Alberta (CA)

( * ) Notice: Subject to any disclaimer, the term of this patent is extended or adjusted under 35 U.S.C. 154(b) by 666 days.

(21) Appl. No.: 13/207,026

(22) Filed: Aug. 10, 2011

(65) Prior Publication Data

US 2012/0039780 A1    Feb. 16, 2012

(30) Foreign Application Priority Data

Aug. 12, 2010  (CA) ..................................... 2712046

(51) Int. Cl.
| | | |
|---|---|---|
| *B01D 53/52* | (2006.01) | |
| *B01D 53/78* | (2006.01) | |
| *C01B 17/05* | (2006.01) | |

(52) U.S. Cl.
CPC ................ *B01D 53/52* (2013.01); *B01D 53/78* (2013.01); *B01D 2251/102* (2013.01); *B01D 2251/104* (2013.01); *B01D 2252/103* (2013.01); *B01D 2257/304* (2013.01); *B01D 2257/7022* (2013.01); *B01D 2257/708* (2013.01); *C01B 17/05* (2013.01)

(58) Field of Classification Search
None
See application file for complete search history.

(56) References Cited

U.S. PATENT DOCUMENTS

| | | |
|---|---|---|
| 4,145,279 A | 3/1979 | Selby, III |
| 4,256,574 A | 3/1981 | Bhargava |
| 4,504,388 A | 3/1985 | Desbos et al. |
| 6,464,875 B1 | 10/2002 | Woodruff |
| 6,569,338 B1 | 5/2003 | Ozyboyd |
| 6,740,245 B2 | 5/2004 | Johnson |
| 6,869,540 B2 | 3/2005 | Robinson et al. |
| 6,923,901 B2 | 8/2005 | Leffler et al. |
| 7,137,620 B2 | 11/2006 | Thomas et al. |
| 7,273,562 B2 | 9/2007 | Robinson et al. |
| 7,381,338 B2 | 6/2008 | Van Leeuwen et al. |

(Continued)

FOREIGN PATENT DOCUMENTS

| | | |
|---|---|---|
| JP | 2000189981 | 7/2000 |
| KR | 6104476 | 2/2004 |

(Continued)

OTHER PUBLICATIONS

Wills, Jonathan. "Muddied Waters: A Survey of Offshore Oilfield Drilling Wastes and Disposal Techniques to Reduce the Ecological Impact of Sea Dumping". Available at http://www.offshore-environment.com/ productionwaters.html at least as early as Jan. 2002.

*Primary Examiner* — Stanley Silverman
*Assistant Examiner* — Daniel Berns
(74) *Attorney, Agent, or Firm* — David & Bujold, P.L.L.C.; Michael J. Bujold

(57) ABSTRACT

An apparatus for treating headspace gas has a production water tank, a source of at least one of oxygen and ozone, a diffuser, and a reaction tank. The production water tank contains a headspace gas and a headspace gas outlet. At least a portion of the headspace gas is a sulfide gas. The diffuser diffuses a mixture of the at least one of oxygen and ozone and headspace gas from the production water tank via the headspace gas outlet into a liquid solvent. The at least one of oxygen and ozone oxidizes at least a portion of the sulfide gas as they pass through the diffuser. The reaction tank for receives the liquid solvent.

9 Claims, 2 Drawing Sheets

(56) References Cited

U.S. PATENT DOCUMENTS

| | | | |
|---|---|---|---|
| 7,402,253 B2 | 7/2008 | Van Leeuwen et al. | |
| 8,366,932 B1 * | 2/2013 | Sung et al. | 210/603 |
| 2004/0099607 A1 | 5/2004 | Leffler et al. | |
| 2008/0314807 A1 | 12/2008 | Junghanns et al. | |

FOREIGN PATENT DOCUMENTS

| | | |
|---|---|---|
| KR | 200344145 | 2/2004 |
| WO | 2005049502 | 6/2005 |
| WO | 2005061388 | 7/2005 |

* cited by examiner

HEADSPACE GAS TREATMENT APPARATUS AND METHOD

FIELD

A method and apparatus for treating headspace gas, specifically, headspace gas in a production water tank containing hydrogen sulphide.

BACKGROUND

The headspace gas related to production water from a well, such as a hydrocarbon producing well, may contain hydrogen sulphide. A common method of scrubbing hydrogen sulfide from the headspace gas uses ammonia in a scrubbing tower.

SUMMARY

There is provided an apparatus for treating headspace gas comprises a production water tank, a source of at least one of oxygen and ozone, a diffuser, and a reaction tank. The production water tank comprises a headspace gas and a headspace gas outlet, at least a portion of the headspace gas comprising a sulfide gas. The diffuser for diffuses a mixture of the at least one of oxygen and ozone and headspace gas from the production water tank via the headspace gas outlet into a liquid solvent. The at least one of oxygen and ozone oxidizes at least a portion of the sulfide gas as they pass through the diffuser. A reaction tank for receives the liquid solvent.

According to another aspect, the separator may comprise a filter.

According to another aspect, the diffuser may comprise a venturi that mixes the at least one of oxygen and ozone, the headspace gas and the liquid solvent at an inlet to the diffuser, the liquid solvent comprising a motive fluid for the venturi.

According to another aspect, there is provided a method of treating hydrogen sulphide in headspace gas, the method comprising the steps of: drawing headspace gas from a production water tank, at least a portion of the headspace gas comprising hydrogen sulphide; diffusing at least one of oxygen and ozone and the headspace gas into a liquid solvent such that the ozone and headspace gas dissolve into the liquid solvent and such that the hydrogen sulphide reacts with the ozone to produce sulphate or sulphur; and ejecting the liquid solvent into a reaction tank.

According to another aspect, the method may further comprises the step of separating the sulphur and the liquid solvent. Separating the sulphur may comprise filtering the liquid solvent through a filter.

According to another aspect, the method may further comprise the step of adjusting the pH of the liquid solvent to less than 8.5.

According to another aspect, diffusing the at least one of oxygen and ozone may comprise using a diffusion tower. The diffusion tower may comprise a venturi at an inlet of the diffusion tower. The liquid solvent may comprise a motive fluid for the venturi, and the headspace gas and the liquid solvent may be injected into the venturi to mix with the motive fluid.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
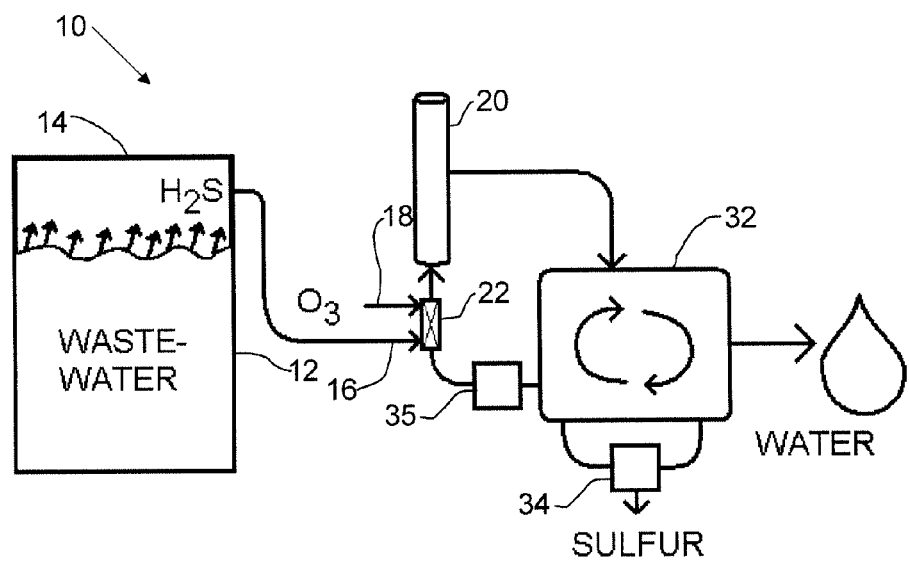
FIG. 1 is a block diagram of an apparatus for treating headspace gas.

An apparatus for treating headspace gas, generally identified by reference numeral 10, will now be described with reference to FIG. 1 through 3.

As production water is stored in a production tank, gas may be released into the "headspace" of the tank. Referring to FIG. 1, apparatus for treating headspace gas 10 includes a production water tank 12 that contains production water 12 and a headspace gas 14. At least a portion of headspace gas 14 includes hydrogen sulfide gas, and may also include VOCs (volatile organic compounds) and VPHs (volatile petroleum hydrocarbons). Production water tank 12 has a headspace gas outlet 16.

There is a source of one or both of oxygen ($O_2$) and ozone ($O_3$) 18. In the example discussed below, ozone is used as it is more reactive than oxygen as an oxidizing agent, and is preferably produced by an ozone generator. However, it will be understood that oxygen, or a mixture of ozone and oxygen, may also be used. Source of ozone 18 and headspace gas outlet 16 are fed into a diffusion tower 20 by means of, for example, a venturi 22. An example of a suitable diffusion tower is described in U.S. Pat. No. 7,137,620 (Thomas et al.) entitled "Diffuser and aeration apparatus equipped with such a diffuser", a portion of which can be seen connected to the venturi 22, having slots 23 that generate shear forces in the mixture and otherwise encourage the formation of microbubbles and dissolving the gases into the liquid stream. This is done to cause the reactions to occur in solution, which increases the efficiency of the system. Referring to FIG. 3, an example of how this may be accomplished is shown. As shown, angled slots 23 are provided that direct fluid into flow paths that intersect.

Figure 2:
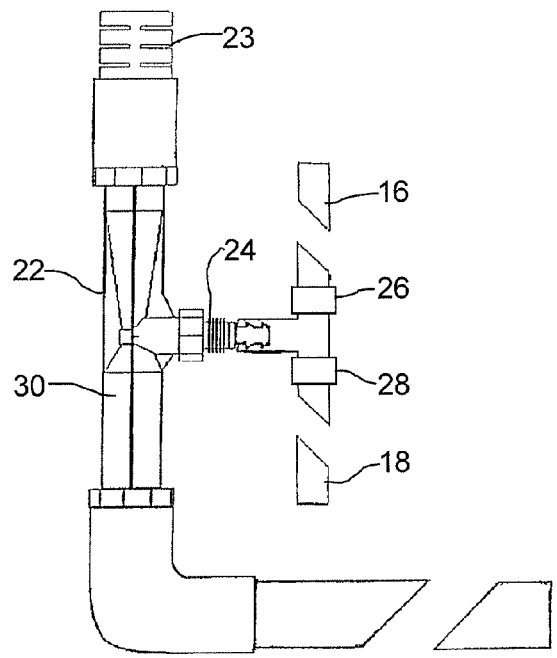
FIG. 2 is a side elevation view of a venturi.
Figure 3:
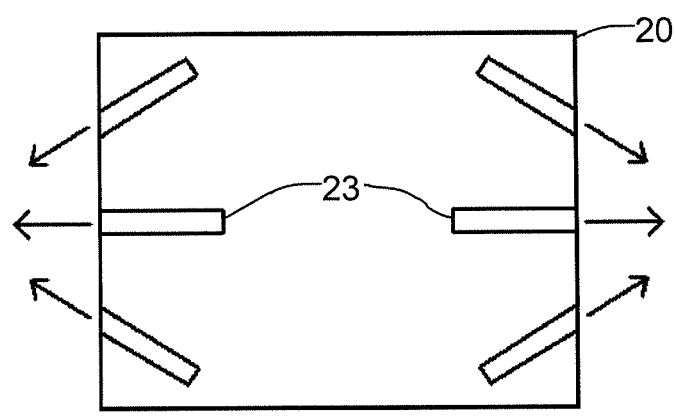
FIG. 3 is a side elevation view of a portion of a diffusion tower.

Referring to FIG. 2, venturi 22 acts as the inlet to diffusion tower 20. Headspace gas outlet 16 and ozone 18 are fed into the gas inlet 24 of venturi 22 via regulators 26 and 28, respectively. Regulators 26 are adjusted to minimize any excess ozone or hydrogen sulfide in the products of the reaction. A liquid solvent, preferably water, is fed into the motive inlet 30 of and accelerated through venturi 22. The gas mixture is under low pressure such that it is drawn into venturi 22 and carried through venturi 22 by the liquid solvent. At the same time, the ozone substantially oxidizes the sulphide gas as they pass through the venturi. The extent of the oxidation will depend upon the ratio of oxygen/ozone to hydrogen sulfide, the operating parameters of the venturi, and the pH at which the reaction occurs. Referring to FIG. 1, the mixture is passed through diffusion tower 20 and is then ejected into a reaction tank 32. The oxidation reaction begins in the venturi, continues in the diffusion tower, and is completed in the reaction tank 32. While the majority of the oxidation reaction will occur as the fluids pass through the diffusion tower 20, any remaining hydrogen sulfide or other contaminants will be oxidized in reaction tank 32.

With respect to hydrogen sulfide, and in the preferred embodiment that uses ozone, ozone reacts with $H_2S$ in solution, following two simultaneous competing reactions:

$$H_2S + O_3 \rightarrow S_{(s)} + O_2 + H_2O \tag{1}$$

$$3H_2S + 4O_3 \rightarrow 3H_2SO_4 \tag{2}$$

The first reaction is favored for pH levels that below 8.5, while the second reaction is favored for pH levels above 8.5. While apparatus 10 may operate at any pH, a lower pH allows the sulfur product to be more easily removed, which enhances the longevity of apparatus 10. The pH in the tank may be adjusted using known techniques to favour one reaction or the other.

Referring to FIG. 2, the liquid solvent is water from reaction tank 32 as pumped by pump 35. There may be a separator 34 for separating the sulfur if in solid form, such as a physical filter. If the reaction produces primarily sulphuric acid, it may be necessary to provide a different source of liquid solvent, and separator 34 may not be required. Alternatively, separator 34 or another type of filter may be incorporated into pump 35.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A method of treating hydrogen sulphide in headspace gas, comprising the steps of:
    drawing headspace gas from a production water tank with at least a portion of the headspace gas comprising hydrogen sulphide,
    regulating amounts of the headspace gas, ozone, and a liquid solvent supplied for an oxidation reaction;
    mixing the hydrogen sulphide with the ozone and commencing the oxidation reaction between the hydrogen sulphide and the ozone;
    intermixing the mixed hydrogen sulphide and the ozone with the liquid solvent, in a venturi, and conveying the intermixed hydrogen sulphide, the ozone and the liquid solvent into a diffuser for continuation of the oxidation reaction and further dissolving the Ozone and the headspace gas into the liquid solvent;
    ejecting the liquid solvent with the dissolved ozone and the headspace gas into a separate reaction tank thereby completing the oxidation reaction in the reaction tank; and
    removing water and sulfur byproduct from the reaction tank and reusing a portion of the liquid from the reaction tank as the liquid solvent.

2. A method of treating hydrogen sulphide in headspace gas, the method comprising the steps of:
    drawing headspace gas from a production water tank, at least a portion of the headspace gas comprising hydrogen sulphide,
    diffusing the headspace gas and a reaction gas comprising at least one of oxygen and ozone into a liquid solvent such that the reaction gas and the headspace gas dissolve into the liquid solvent and the hydrogen sulphide reacts with the at least one of oxygen and ozone to produce at least one of sulphate or sulphur; and
    ejecting the liquid solvent with the dissolved gases into a separate reaction tank.

3. The method of claim 2, further comprising the step of adjusting the pH of the liquid solvent to less than 8.5.

4. The method of claim 2, further comprising the step of using a diffusion tower for diffusing the reaction gas, and ejecting the liquid solvent with the dissolved gases from the diffusion tower into the reaction tank.

5. The method of claim 4, wherein the diffusion tower comprises a venturi at an inlet of the diffusion tower, the liquid solvent comprising a motive fluid for the venturi, and the headspace gas and the liquid solvent being injected into the venturi to mix with the motive fluid.

6. The method of claim 5, further comprising the step of adjusting at least one of a hydrogen sulfide regulator, a reaction gas regulator, and a liquid solvent regulator, associated with the venturi, so as to control mixing and to minimize at least one of an excess amount of the hydrogen sulfide, an excess amount of the reaction gas, and an excess amount of the liquid solvent.

7. The method of claim 2, further comprising the step of using ozone as the reaction gas.

8. The method of claim 2, further comprising the step of separating the at least one of sulfate and sulphur from the liquid solvent.

9. The method of claim 8, wherein the step of separating the at least one of sulfate and sulphur from the liquid solvent comprises filtering the liquid solvent through a filter.

* * * * *